US008819496B2

(12) United States Patent
Ike

(10) Patent No.: US 8,819,496 B2
(45) Date of Patent: Aug. 26, 2014

(54) APPARATUS FOR COLLECTING TRACE INFORMATION AND PROCESSING TRACE INFORMATION, AND METHOD FOR COLLECTING AND PROCESSING TRACE INFORMATION

(75) Inventor: Atsushi Ike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 195 days.

(21) Appl. No.: 12/940,070

(22) Filed: Nov. 5, 2010

(65) Prior Publication Data

US 2011/0113291 A1 May 12, 2011

(30) Foreign Application Priority Data

Nov. 9, 2009 (JP) .................................. 2009-255956

(51) Int. Cl.
*G06F 11/00* (2006.01)
(52) U.S. Cl.
USPC .............................. 714/45; 714/25; 717/128
(58) Field of Classification Search
CPC ............ G06F 11/3476; G06F 11/3636; G06F 2201/88; G06F 11/3466; G06F 11/3419; G06F 2201/865
USPC ...................... 714/45, 25; 717/128
See application file for complete search history.

(56) References Cited

U.S. PATENT DOCUMENTS

| 5,485,574 | A  | * | 1/1996 | Bolosky et al. | 714/35 |
| 6,345,295 | B1 | * | 2/2002 | Beardsley et al. | 709/224 |
| 6,347,383 | B1 | * | 2/2002 | Elnozahy | 714/53 |
| 6,351,844 | B1 | * | 2/2002 | Bala | 717/128 |
| 6,425,522 | B1 | * | 7/2002 | Matsumoto et al. | 235/380 |
| 6,742,179 | B2 | * | 5/2004 | Megiddo et al. | 717/130 |
| 6,848,098 | B1 | * | 1/2005 | Tsuboi | 717/151 |
| 7,007,270 | B2 | * | 2/2006 | Martin et al. | 717/131 |
| 7,509,485 | B2 | * | 3/2009 | Chou | 713/100 |
| 7,590,974 | B2 | * | 9/2009 | Johnsen et al. | 717/128 |

(Continued)

FOREIGN PATENT DOCUMENTS

| JP | 63-195746 A | 8/1988 |
| JP | 2-242440 A | 9/1990 |

(Continued)

OTHER PUBLICATIONS

Kawaba, Motoyuki et al., "Performance Test Program Generation Using the Reverse Tracer," Research Report of Information Processing Society of Japan, Information Processing Society of Japan Incorporated Association, Mar. 8, 2002, vol. 2002, No. 22, pp. 127-132, with English Abstract and Partial Translation.

(Continued)

*Primary Examiner* — Loan L. T. Truong
(74) *Attorney, Agent, or Firm* — Fujitsu Patent Center

(57) ABSTRACT

In the system, an apparatus for collecting trace information provided on a circuit executing a program includes a counter unit which increments a count value for each execution cycle of the program, and a collection unit outputs trace information at a fetching timing of the trace information outputted by the circuit and a count value of the counter unit at the fetching timing. Another apparatus for processing trace information includes a trace information acquisition unit which acquires the trace information added with a count value from a trace information collection apparatus, a sort processing unit which sorts the acquired trace information based on the count value, and a trace information storage unit which store the sorted trace information.

8 Claims, 18 Drawing Sheets

(56) References Cited

U.S. PATENT DOCUMENTS

| | | | |
|---|---|---|---|
| 2001/0011369 A1* | 8/2001 | Satoyama et al. | 717/4 |
| 2004/0153814 A1* | 8/2004 | Swoboda et al. | 714/36 |
| 2004/0170169 A1* | 9/2004 | Swoboda et al. | 370/389 |
| 2005/0138484 A1* | 6/2005 | Moyer et al. | 714/47 |
| 2006/0101416 A1* | 5/2006 | Callahan et al. | 717/128 |
| 2006/0129999 A1* | 6/2006 | Hiraoka et al. | 717/128 |
| 2006/0130000 A1* | 6/2006 | Miyao et al. | 717/128 |
| 2006/0184832 A1* | 8/2006 | Floyd et al. | 714/45 |
| 2008/0010550 A1* | 1/2008 | Agarwala | 714/45 |
| 2008/0040634 A1* | 2/2008 | Matsuzaki et al. | 714/47 |
| 2008/0115115 A1* | 5/2008 | Codrescu et al. | 717/128 |
| 2008/0256396 A1* | 10/2008 | Giannini et al. | 714/45 |
| 2008/0282087 A1* | 11/2008 | Stollon et al. | 713/171 |
| 2008/0288234 A1* | 11/2008 | Nelson et al. | 703/22 |
| 2009/0037704 A1* | 2/2009 | Thekkath | 712/227 |
| 2009/0164980 A1* | 6/2009 | Rossmann et al. | 717/128 |
| 2009/0248381 A1* | 10/2009 | Liu et al. | 703/13 |
| 2009/0313460 A1* | 12/2009 | Huang et al. | 712/227 |
| 2010/0318972 A1* | 12/2010 | Xu et al. | 717/128 |
| 2010/0332909 A1* | 12/2010 | Larson | 714/40 |
| 2011/0067008 A1* | 3/2011 | Srivastava et al. | 717/128 |

FOREIGN PATENT DOCUMENTS

| | | |
|---|---|---|
| JP | 03-127253 A | 5/1991 |
| JP | 2001-184235 A | 7/2001 |
| JP | 2003-76578 A | 3/2003 |

OTHER PUBLICATIONS

Japanese Office Action mailed Aug. 27, 2013 for corresponding Japanese Application No. 2009-255956, with Partial English-language Translation.

Japanese Office Action mailed Feb. 4, 2014 for corresponding Japanese Application No. 2009-255956, with English-language Translation, 4 pages.

* cited by examiner

```
int main() {
  while(i++<1**10) {
    counter_reset();
    BODY();
  }
  ...
}
```

FIG. 13A

```
int BODY() {
  FN_A();
  FN_A();
  FN_D();
  ...
}
int FN_A() {
  FN_B();
  ...
}
int FN_B() {
  FN_C();
  ...
}
int FN_C() {
  ...
}
int FN_D() {
  ...
}
```

FIG. 13B

APPARATUS FOR COLLECTING TRACE INFORMATION AND PROCESSING TRACE INFORMATION, AND METHOD FOR COLLECTING AND PROCESSING TRACE INFORMATION

CROSS-REFERENCE TO RELATED APPLICATION

This application is based upon and claims the benefit of priority of the prior Japanese Patent Application No. 2009-255956 filed on Nov. 9, 2009, the entire contents of which are incorporated herein by reference.

FIELD

A certain aspect of the embodiments discussed herein is related to an apparatus for collecting trace information and processing trace information.

BACKGROUND

Tracing is a technique for collecting trace information which is recorded on operation of a CPU, a hard macro, a bus and the like on a target chip, and can be read from the outside. In general, the trace information may faithfully express internal state of a component on the chip and thus is widely used for debugging, problem analysis, and various evaluations.

As a processing method using tracing, there has been known a non-invasive debugging method using an embedded tracing.

According to the non-invasive debugging method using the embedded tracing, operating information is collected in units of cycles from each target component operating at high speeds and then transferred through a dedicated route of a backplane to the outside of the target chip. Subsequently, the externally transferred trace information is analyzed by a dedicated viewer installed in a platform for development work, a personal computer, and the like.

To perform the embedded tracing, hardware needs for assist. Namely, hardware is required as a part of embodiment for embedded tracing. During performing the embedded tracing, operation of the target chip does not need to stop. Thus, the embedded tracing can acquire extremely reliable information, but needs to a mechanism for transferring a large amount of predefined recorded information to the outside.

Meantime, JTAG (Joint Test Action Group) has been known as an invasive debugging method. According to the JTAG method, a built-in function such as a break point and a watch point configured on a target chip is used to stop a CPU and a hard macro on the target chip, then debugging of the CPU or the hard macro is to be performed using referring and changing a register and a memory thereof and performing a step execution. Since such invasive debugging method may involve tweaking and stopping the target operation, the method may provide information about an operation different from the actual operation. Further, the method provides only pinpoint information and thus may lack in completeness of tracing information. On the other hand, the method may reduce burden in implementation and thin transmission lines suffices in many cases.

As another tracing method, there has been known a method using a bus tracing apparatus in multi-processor system, whereby a timer scale value and common bus trace information are stored in association with each other, then a time when the trace information occurs is determined and a trace sequence corresponding to a plurality of cores is captured.

As patent document, Japanese Patent Laid-Open No. 3-127253 may disclose an art related to the invention.

Conventionally, in order to externally transfer a large amount of predefined information in units of cycles, the non-invasive debugging method using embedded tracing needs not only a mechanism for externally transferring the trace information read from each component, but also a large volume intermediate buffer for storing a huge amount of the read data with a flow rate thereof, an interface with a high throughput and the like on the chip. Further, outside the chip, there is also required an interface and a large volume buffer for receiving the transferred trace information. Consequently, the conventional non-invasive debugging method using embedded tracing has a problem that there is a need to cope with a large physical capacity as a whole.

Therefore, there may be a problem in the conventional embedded tracing that a target chip is limited based on an estimated flow rate of trace information. For example, in a case that a trace target is a processor, trace information thereof may be generally an execution history data of the processor in units of instructions. Thus, when the processor is complicated in configuration and operates at high speeds, the embedded tracing needs a large scaled mechanism. Alternatively, in a case that a trace target is a hard macro, a trace information in a single tracing may involve a huge amount of data depending on configuration of the target hard macro. Further, in a case that a plurality of state machines exists in the target hard macro, the data of each state data multiplied by the number of state machines may need to be processed. Thus, in accordance with configuration of a target, the embedded tracing is required to devote a larger physical capacity to a mechanism for tracing.

As described above, conventionally, a target that is capable of installing the embedded tracing mechanism is limited to a relatively small component such as a prototype chip and an emulator chip. Moreover, it may be very difficult to implement the embedded tracing mechanism depending on constraint of chip configuration.

In light of the above-mentioned advantages of the embedded tracing, it is desirable to realize collection of trace information by installing and using an embedded tracing mechanism built-in a final chip form, namely, an actual product form.

However, it is more and more difficult to apply the embedded tracing mechanism built-in a chip due to physical restrictions because further integration of circuits and an increase in data processing amount for each component, and the like.

SUMMARY

Outline of an apparatus for collecting trace information and processing trace information disclosed here as one aspect of the invention will be briefly described below.

An apparatus for collecting trace information, disclosed as one aspect of the invention, includes a circuit which executes a program; a counter unit configured to increment a count value for each execution cycle of the program; and a collection unit configured to output trace information at a fetching timing of the trace information outputted by the circuit and a count value of the counter unit at the fetching timing.

Moreover, an apparatus for processing trace information, disclosed as another aspect of the invention, includes a trace information acquisition unit configured to acquire trace information and a count value from a trace information collection apparatus which when a program is executed by the circuit, increments the count value for each execution cycle of the program, and outputs the trace information at a fetching timing of the trace information outputted by the circuit and a count value of the counter unit at the fetching timing; a sort processing unit configured to sort the acquired trace information based on the count value; and a trace information storage unit configured to store the sorted trace information.

A method, disclosed as yet another aspect of the invention, for collecting and processing trace information of a circuit block constituting a circuit board, includes a processing step in which the trace information collection apparatus increments a count value for each execution cycle of the program; a processing step in which the trace information collection apparatus outputs the trace information at a fetching timing of the trace information outputted by the circuit and a count value of the counter unit at the fetching timing; a processing step in which the trace information processing apparatus acquires the trace information and the count value; and a processing step in which the trace information collection apparatus sorts the acquired trace information based on the count value.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 13 illustrates an example of a program executed by a target hardware in a case in which the trace information collection system collects trace information as an embodiment of one aspect of the present invention.

DETAILED DESCRIPTION OF THE PREFERRED EMBODIMENTS

First, an example of an embedded tracing mechanism studied by the present inventor will be described.

Figure 15:
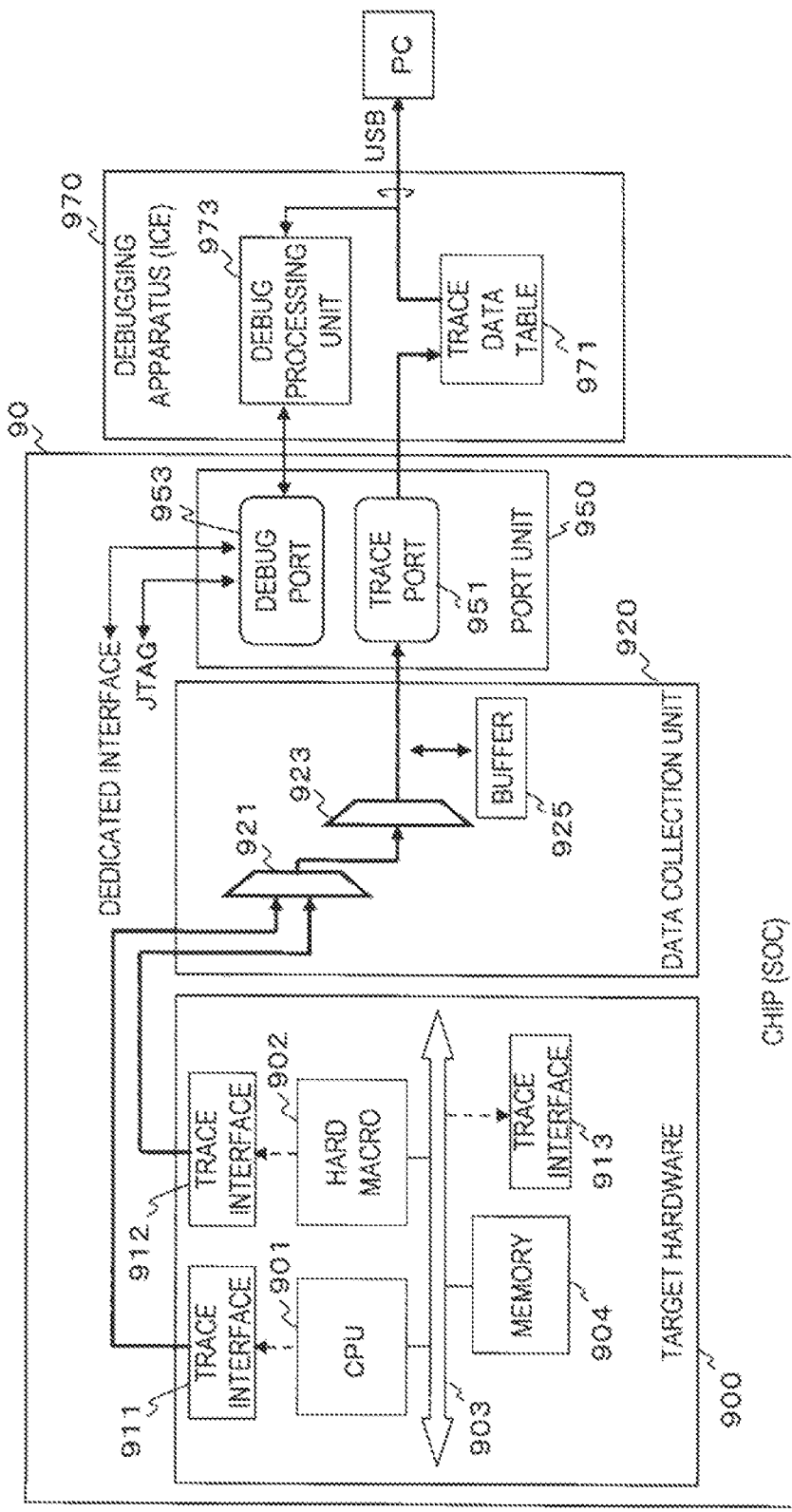
FIG. 15 illustrates a configuration example of a circuit board installing an embedded tracing mechanism studied by the present inventor.

FIG. 15 illustrates a configuration example of a circuit board in which an embedded tracing mechanism is installed.

A chip (SoC) 90 is a circuit board of an SoC (System on a Chip) in which the embedded tracing mechanism is installed. A target hardware 900 is assumed a component subjected to collecting trace information on the chip 90. Here, the target hardware 900 is a circuit block constituting the circuit board and includes internal components such as a CPU 901, a hard macro 902, a bus 903, and a memory 904. The hard macro 902 is a part of the circuit embedded as mask-fixed hardware.

The target hardware 900 includes trace interface units 911, 912, and 913 each corresponding to the CPU 901, the hard macro 902, and the bus 903 respectively. Further, the chip 90 includes a data collection unit 920 and a port unit 950, both of which unit are provided outside the target hardware 900. Furthermore, the chip 90 is connected to a debugging apparatus 970, which is externalized from the chip 90.

The trace interface units 911, 912, and 913 each acquire trace information in units of cycles of the chip 90 from the CPU 901, the hard macro 902, and the bus 903 of the chip 90 and store the acquired trace information in a register thereof, respectively. Here, the cycle unit is a unit of a process execution period of the chip 90, and the trace information is acquired in synchronism with a clock of the chip 90.

The data collection unit 920 includes selectors 921 and 923, and a buffer 925. The data collection unit 920 collects trace information from the trace interface units 911, 912, and 913 through the selectors 912 and 913 and stores the collected trace information in the buffer 925.

The port unit 950 includes a trace port 951 and a debug port 953. The port unit 950 outputs the trace information stored in the buffer 925 of the data collection unit 920 through the trace port 951 to outside of the chip 90. For example, the port unit 950 transfers the trace information to the debugging apparatus 970.

The debugging apparatus 970 includes a trace data table 971 and a debug processing unit 973. The trace information outputted from the chip 90 is stored in the trace data table 971. The debug processing unit 973 performs a predetermined debug processing on the trace information stored in the trace data table 971. The debugging apparatus 970 is, for example, an ICE (In-Circuit Emulator, registered trademark of the Intel Corporation). Note that the debugging apparatus 970 outputs the trace information stored in the trace data table 971 to a connected computer (PC) as needed.

Figure 16:
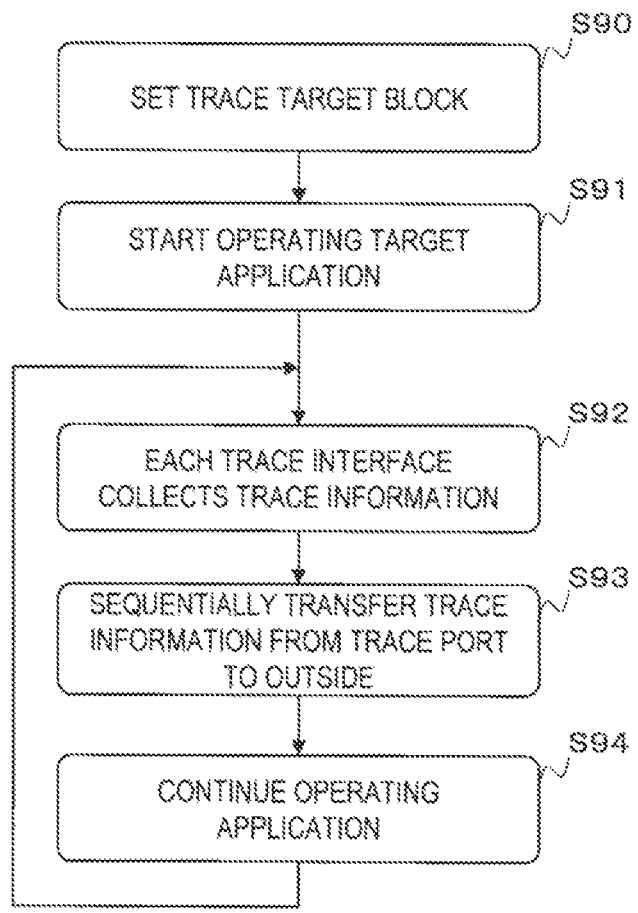
FIG. 16 illustrates a process flow of the embedded tracing mechanism illustrated in FIG. 15.

FIG. 16 illustrates a process flow example of the embedded tracing mechanism in the chip 90 illustrated in FIG. 15.

The target hardware 900 is set as a trace target block of the chip 90 (step S90). When an application program starts operating on the target hardware 900 (step S91), each internal component of the target hardware 900 undergoes the following process.

When each of the trace interface units 911, 912, and 913 of the target hardware 900 reads trace information (trace data) for each cycle from the respective internal components, then the data collection unit 920 collects trace data from the trace interface units 911, 912, and 913 and temporarily stores the trace data in the buffer 925 (step S92). Subsequently, the port unit 950 sequentially transfers the trace data from the trace port 951 to the external debugging apparatus 970 (step S93). While the application program continues executing (step S94), the process returns to step S92, in which trace data collection is repeated.

Figure 17:
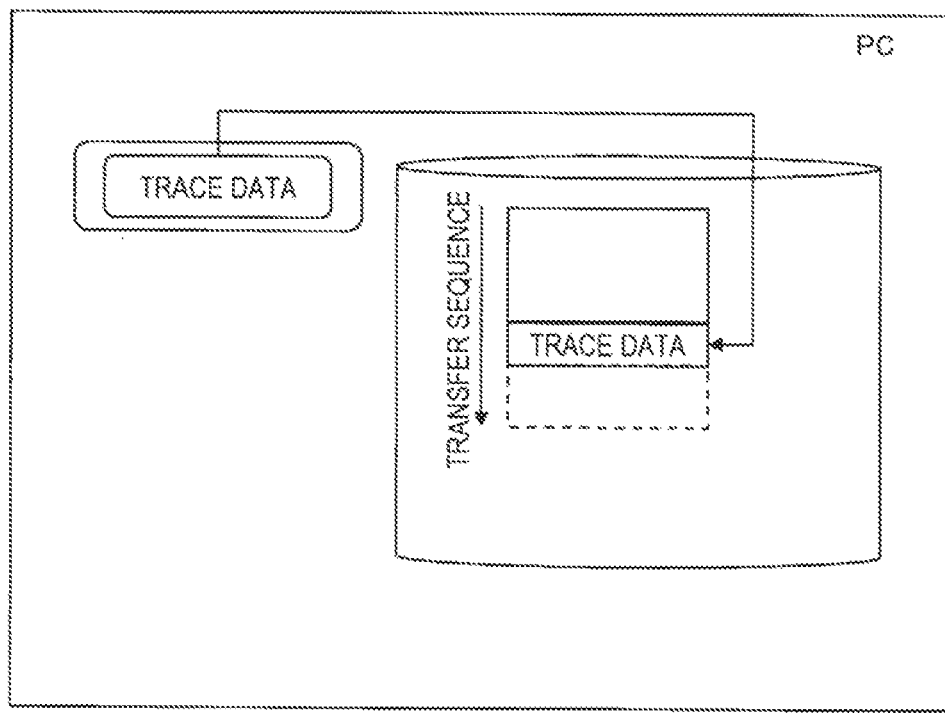
FIG. 17 illustrates an example in which trace information externally transferred from a chip is stored in the embedded tracing mechanism studied by the present inventor.

FIG. 17 illustrates a storage example of trace information externally transferred from the chip 90.

As illustrated in FIG. 17, trace data is sequentially added to the trace data table 971 of the debugging apparatus 970 in the transfer sequence.

While the application program continues operating on the target hardware 900, the process from step S92 to S94 is repeated.

Here, when the chip 90 illustrated in FIG. 15 is, for example, a 32-bit architecture, the amount of data of trace information indicating an instruction execution and data transfer of the CPU 901 of the target hardware 900 is about 32 to 128 bytes/cycle. Likewise, the amount of data of trace information indicating data processing and state transition of the hard macro 902 is about 32 to 1024 bytes/cycle, and the amount of data of trace information indicating data transfer, transfer type, and the like, of the bus 903 is about 16 to 256 bytes/cycle.

Figure 18:
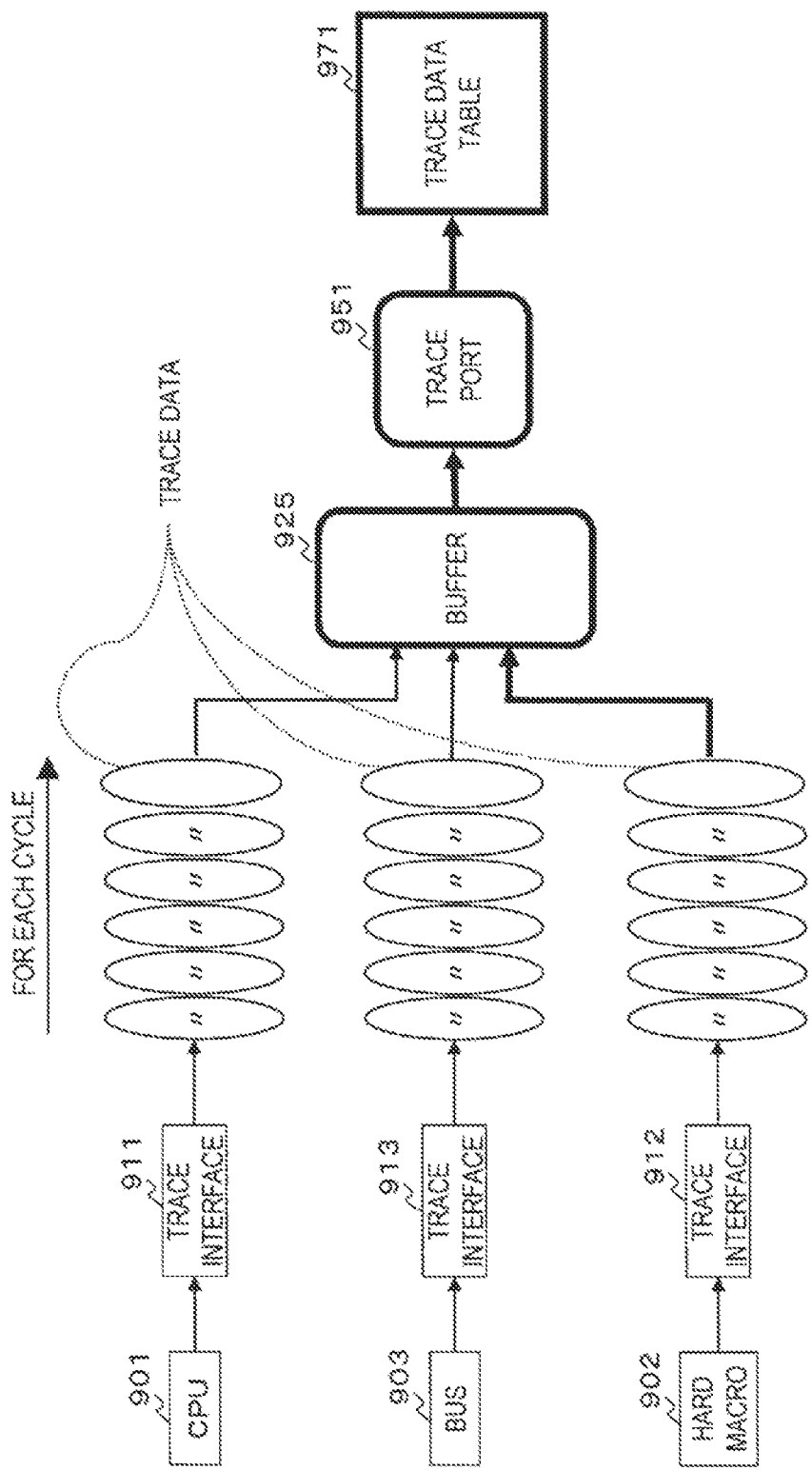
FIG. 18 schematically illustrates a flow of trace information collected for each cycle from a circuit block to be traced in the embedded tracing mechanism studied by the present inventor.

FIG. 18 schematically illustrates a flow of trace information collected for each cycle from a circuit block to be traced. As illustrated in FIG. 18, when trace information is collected for each cycle from an internal component of the circuit block to be traced, the data path bandwidth from each of the trace interface units 911, 912, and 913 to the data collection unit 920 needs to be increased.

Further, when the number of pins of the trace port 951 of the port unit 950 is restricted by the physical constraints of the chip 90, the buffer 925 of the data collection unit 920 needs to be increased to cope with the scale of the trace port 951.

However, it may be difficult to provide a large data path or buffer dedicated to trace information in the chip 90. In particular, when the port of the chip 90 has some constraints, it is difficult to externally output a large amount of trace information in units of cycles from the beginning.

For this reason, a chip capable of installing the embedded tracing mechanism is limited to a relatively small scale chip and it is impossible to install the embedded tracing mechanism in a highly integrated chip such as a mass-produced chip.

In particular, the hard macro 902 is a component, trace information of which for each cycle is estimated to exceed 1000 bytes. Such a component needs to have sufficient bandwidth and buffer size to handle maximum data flow rate. Therefore, it has been actually impossible to trace such a component.

In light of the above considerations, the present inventor has invented a mechanism which can reduce a rate of data flow using a built-in mechanism, which does not impose a burden on scale and configuration of the circuit board and can collect trace information usable for later analysis and the like.

Figure 1:
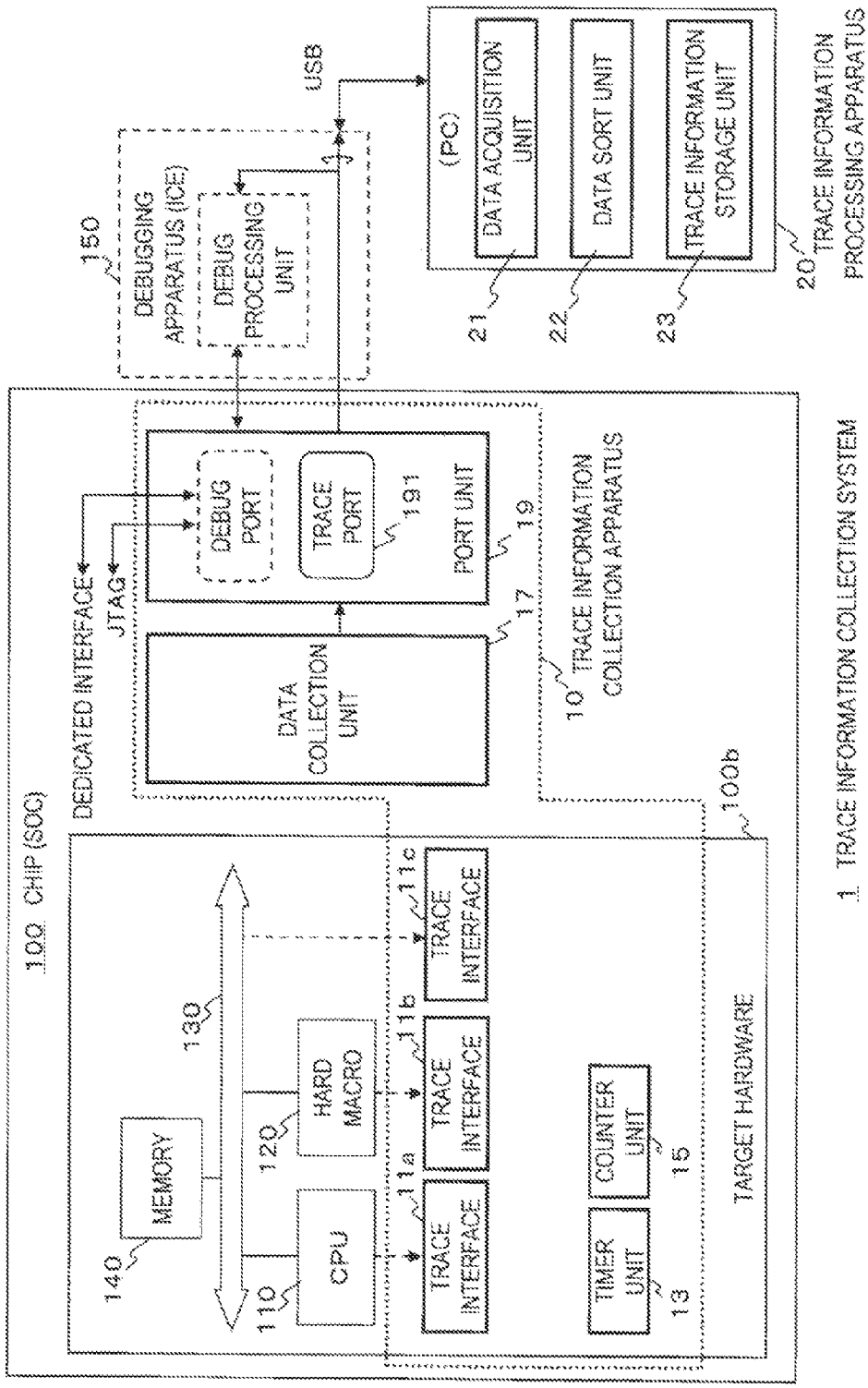
FIG. 1 illustrates a configuration example of a trace information collection system disclosed as an embodiment of one aspect of the present invention.

FIG. 1 illustrates a configuration example of a trace information collection system 1 disclosed as an embodiment of one aspect of the present invention.

The trace information collection system 1 includes a trace information collection apparatus 10 mounted on a circuit board (chip) 100 and a trace information processing apparatus 20 provided outside the chip 100.

The chip 100 is an SoC (System on a Chip) chip.

A circuit block of the chip (SoC) 100 and used as a trace information collection target is referred to as a target hardware 100b. Here, the target hardware 100b includes components such as a CPU 110, a hard macro 120, a bus 130, and a memory 140.

The trace information collection apparatus 10 includes trace interface units (trace I/F) 11, a timer unit 13, a counter unit 15, a data collection unit 17, and a port unit 19. The trace interface units 11, the timer unit 13, and the counter unit 15 are provided in the target hardware 100b.

The trace interface units 11 (11a, 11b, and 11c) acquire trace information from a circuit block on which a program is executing. When an interrupt signal is received from the timer unit 13, the trace interface units 11 output the acquired trace information by adding a count value generated by the counter unit 15 thereto, respectively.

More specifically, each of the trace interface units 11 reads trace information for each cycle of the chip 100 from the respective internal components (the CPU 110, the hard macro 120, and the bus 130) of the target hardware 100b on which the program is executing, and writes the read trace information in an internal register thereof. Then, when an interrupt signal generated by the timer unit 13 is received, the trace interface units 11 acquire a count value generated by the counter unit 15, add the acquired count value to the trace information stored in the register, and output the trace information together with the count value.

According to the present embodiment, the trace interface units 11a, 11b, and 11c read trace information from the CPU 110, the hard macro 120, and the bus 130 respectively.

The timer unit 13 outputs an interrupt signal for each predetermined period based on the cycle of the chip 100.

The timer unit 13 may include a random number generation unit which generates a random number. In this case, the timer unit 13 may be configured to generate and output an interrupt signal at a time when the predetermined period is extended or shortened based on the random number generated by the random number generation unit.

The counter unit 15 generates a count value in such a manner that each time the target hardware 100b starts executing a program, the counter unit 15 initializes a value and increments the value for each cycle. More specifically, when the target hardware 100b executes a program, the counter unit 15 initializes a count value immediately before the program is called and starts. Subsequently, the counter unit 15 increments the count value.

The data collection unit 17 acquires the trace information added with a count value, from the respective trace interface units 11a, 11b, and 11c corresponding to each internal component of the target hardware 100b and transfers the trace information with the count value to the port unit 19.

The port unit 19 receives the trace information with the count value from the data collection unit 17 and externally outputs the trace information with the count value through a predetermined trace port 191. The trace information with the count value is transferred outward to the chip 100, for example, the debugging apparatus (ICE) 150, and then is received by the trace information processing apparatus 20 through the debugging apparatus 150.

Note that the port unit 19 may include a debug port for outputting debug information.

The trace information processing apparatus 20 includes a data acquisition unit 21, a data sort unit 22, and a trace information storage unit 23. The trace information processing apparatus 20 may be implemented by a computer (PC).

The data acquisition unit 21 receives the trace information with the count value transferred from the trace information collection apparatus 10.

The data sort unit 22 sorts the trace information with the count value acquired from the data acquisition unit 21 by the count value and stores the sorted trace information in the trace information storage unit 23.

The trace information storage unit 23 stores the trace information sorted by the data sort unit 22 as extended trace information.

The count value, which is added to the trace information by the trace information collection apparatus 10 of the trace information collection system 1, is a value initialized when the program starts executing and then is incremented. A common count value is added to the trace information collected in a period when the same program is executed a plurality of times on a circuit block to be traced. The trace information processing apparatus 20 of the trace information processing system 1 sorts the trace information by the count value, and thus the trace information collected during the plurality of times of execution is sorted on a time axis.

Figure 2:
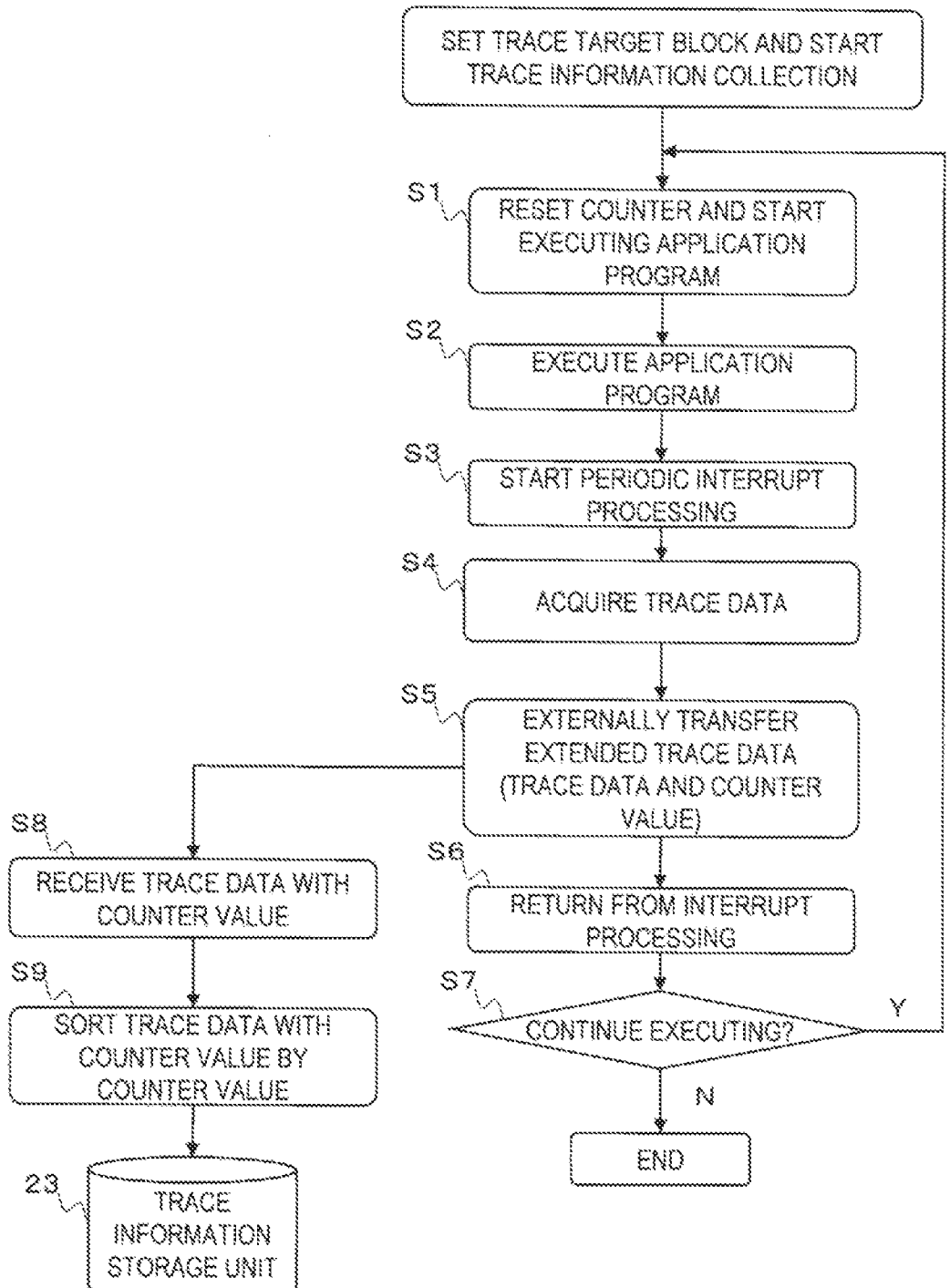
FIG. 2 illustrates a process flow of the trace information collection system disclosed as an embodiment of one aspect of the present invention.

FIG. 2 illustrates a process flow of the trace information collection system 1.

Here, description will be given on an example of trace information collection of the hard macro 120 of the target hardware 100b.

The process of the trace information collection apparatus 10 starts when a parent (high level) layer calling an application program to be executed by the target hardware 100b starts executing the program.

Step S1: The counter unit 15 initializes a count value when the parent layer executes the program. Then, the application program is called to start execution. The counter unit 15 increments the initialized count value for each cycle by 1 (+1).

Step S2: At the target hardware 100b, the application program is executed.

Step S3: The timer unit 13 generates an interrupt signal in an interval from 1 to 10 milliseconds (ms). In response to the interrupt signal, periodic interrupt processing (steps S3 to S6) starts and repeats until step S6.

Step S4: The trace interface unit 11b acquires trace data for each cycle from the hard macro 120 and stores the trace data in an internal register. Then, when the interrupt signal is received, the trace interface unit 11b locks the register and reads the trace data stored in the register. Then, the trace interface unit 11b acquires a count value generated by the counter unit 15 and adds the count value to the read trace data.

Step S5: The data collection unit 17 acquires the trace data with the count value from the trace interface unit 11b and externally outputs the trace data with the count value through the port unit 19.

Step S6: The process returns from the interrupt processing.

Step S7: If the target hardware 100b continues executing the application program (Y in step S7), the process returns to step S1; and if the target hardware 100b does not continue executing the application program (N in step S7), the process ends processing.

Step S8: The data acquisition unit 21 of the trace information processing apparatus 20 receives the trace data with the count value externally outputted in step S5.

Step S9: The data sort unit 22 sorts the received trace data with the count value by the count value and stores the sorted trace data in the trace information storage unit 23.

Figure 3:
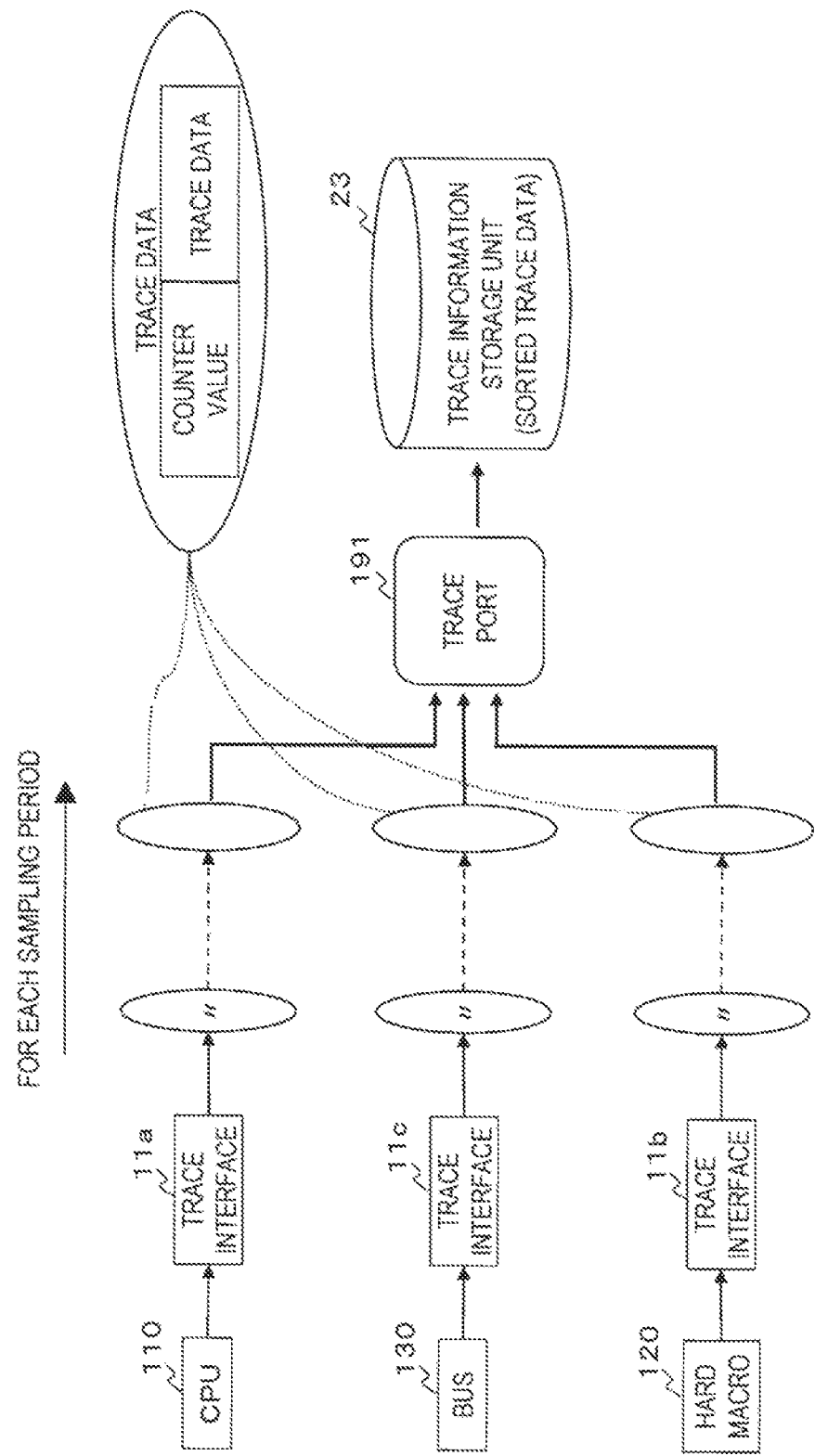
FIG. 3 schematically illustrates a flow of trace information in the trace information collection system disclosed as an embodiment of one aspect of the present invention.

FIG. 3 schematically illustrates a flow of trace information in the trace information collection system 1.

In the trace information collection system 1, the trace interface units 11a, 11b, and 11c of the trace information collection apparatus 10 acquire trace data according to the interrupt signal. More specifically, trace data of the CPU 110, the hard macro 120, and the bus 130 is collected not in units of operating cycle of the target hardware 100b but in a predetermined sampling period, which reduces the entire data flow rate of the trace information collection. Therefore, in the trace information collection system 1, the scale of the data path, the intermediate buffer, the port, and the like become smaller than a conventional system. Moreover, since the trace information collection system 1 can change a period of generating an interruption signal, it is possible to collect trace information at a data flow rate suitable for a scale of embeddable configuration.

Further, as a count value, a value which is incremented from starting of execution of an application program is added to the collected trace data. Therefore, trace data collected during execution of the same application program can be rearranged and organized on the same time axis. As a result, collection of a group of trace data acquired in a shorter interval than the actual sampling period can be realized.

Thus, not only a change in setting of a period of the timer unit 13 can change the actual sampling period but also an increase or decrease of the number of executions of an application program allows trace information to be collected at a density to suit the purpose, the application and the like.

Figure 4:
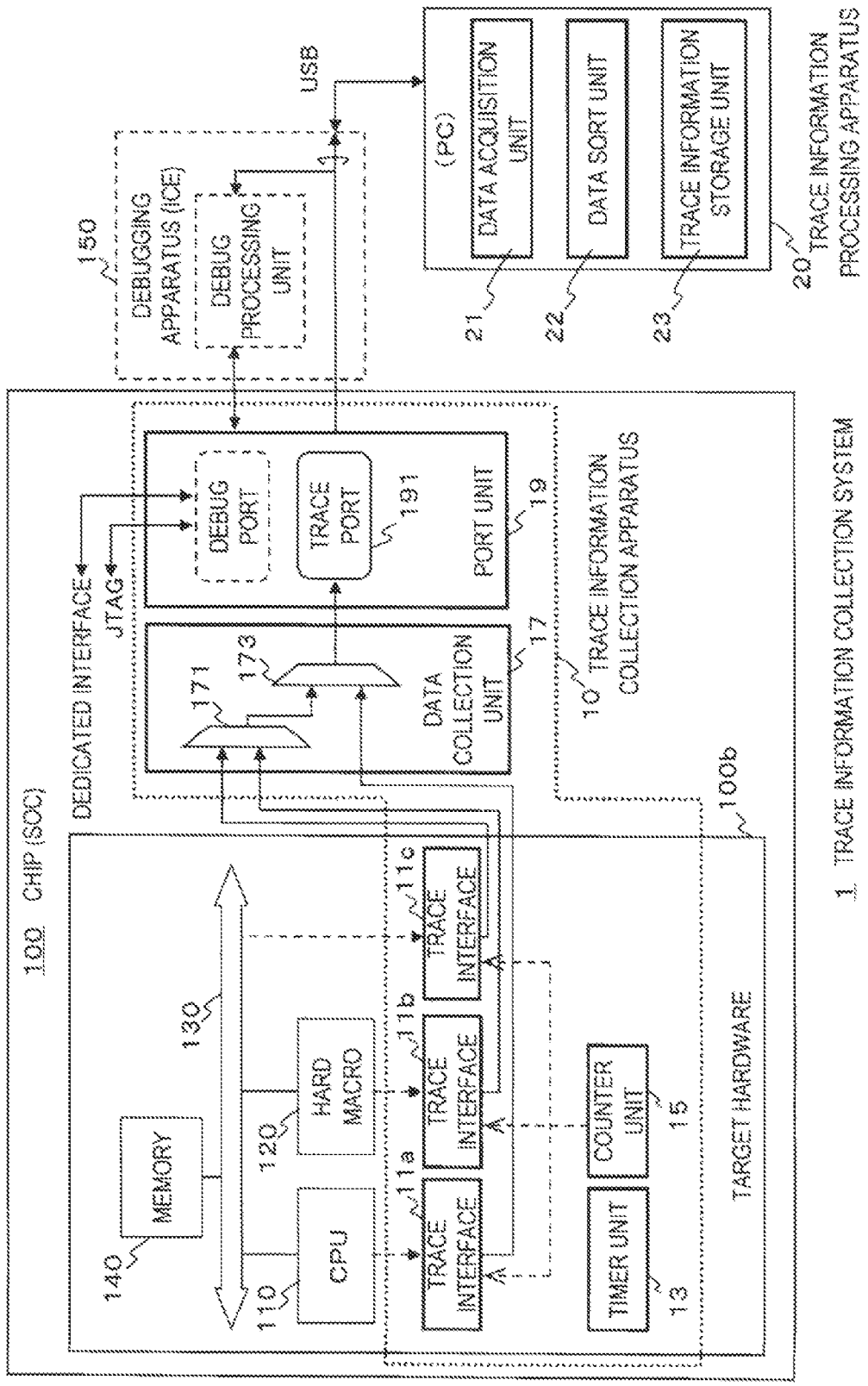
FIG. 4 illustrates a configuration example in which a trace information collection apparatus collects trace information by hardware as an embodiment of the disclosed trace information collection system.

FIG. 4 illustrates a configuration example in which the trace information collection apparatus 10, as another embodiment of the disclosed trace information collection system 1, collects trace information by hardware.

The reference numbers and characters used in the configuration example of the trace information collection system 1 illustrated in FIG. 4 correspond to those in illustrated in FIG. 1.

In the configuration example illustrated in FIG. 4, data paths dedicated to trace information are provided between the trace interface units 11a, 11b, and 11c of the trace information collection apparatus 10 and the data collection unit 17. The data collection unit 17 includes selectors 171 and 173. The data collection unit 17 selects a data path corresponding to one of the trace interface units 11a, 11b, and 11c as a source from which the trace information is to be acquired and then collects trace information added with a count value. The trace interface units 11a, 11b, and 11c each receive an interrupt signal generated by the timer unit 13 and a count value generated by the counter unit 15, and output the trace information with the count value added in response to the interrupt signal.

Figure 5:
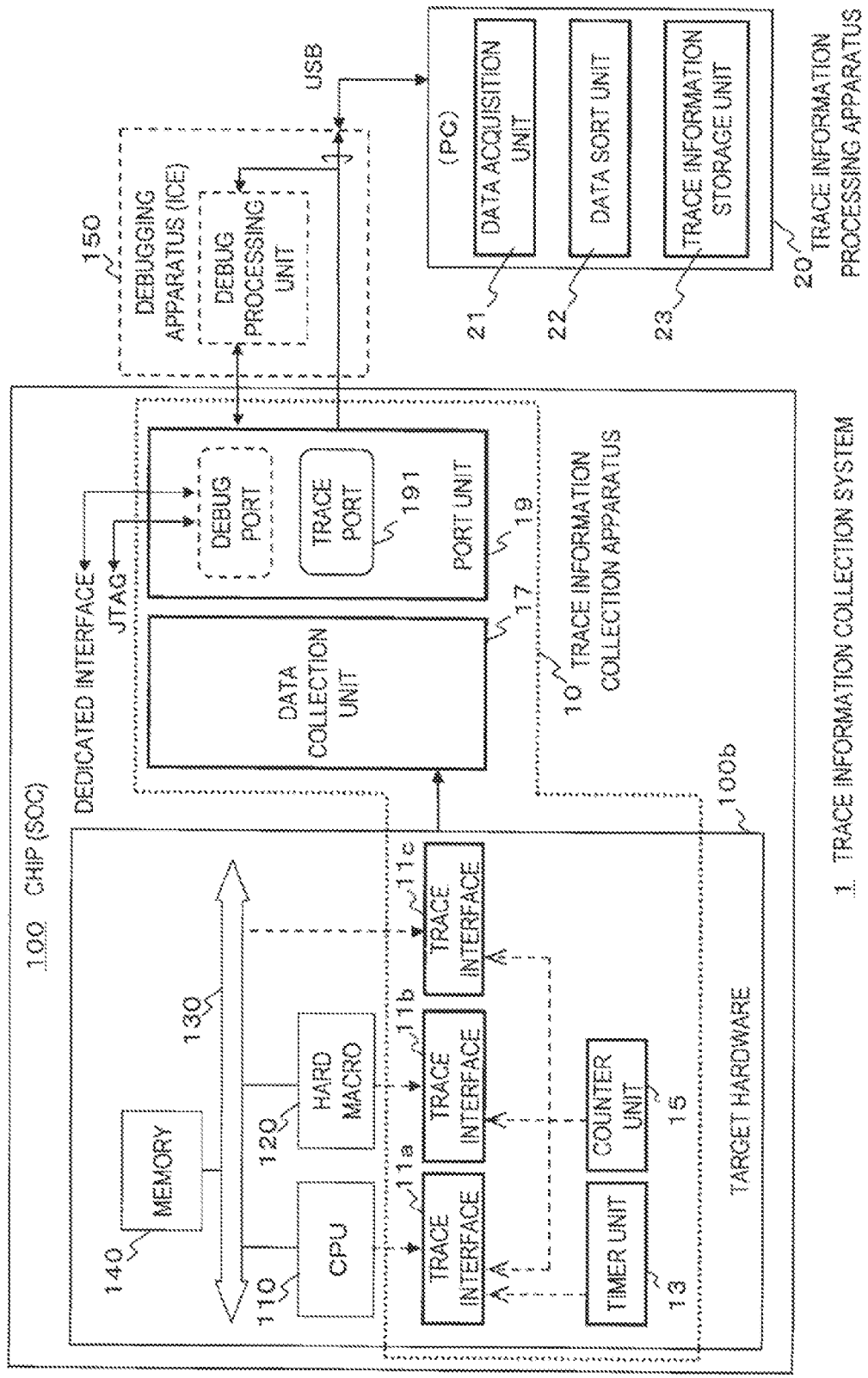
FIG. 5 illustrates a configuration example in which a trace information collection apparatus 10 collects trace information by CPU processing as an embodiment of the disclosed trace information collection system.

FIG. 5 illustrates a configuration example in which the trace information collection apparatus 10 as another embodiment of the disclosed trace information collection system 1 collects trace information by CPU processing.

The reference numbers and characters used in the configuration example of the trace information collection system 1 illustrated in FIG. 5 correspond to those in illustrated in FIG. 1.

In the configuration example illustrated in FIG. 5, the trace information read by the trace interface units 11a, 11b, and 11c of the trace information collection apparatus 10 is outputted to the data collection unit 17 by trace information collection processing of the CPU 110.

The CPU 110 receives an interrupt signal generated by the timer unit 13 and performs trace information collection processing. In the trace information collection processing, the trace interface units 11a, 11b, and 11c each output a count value acquired from the counter unit 15 and trace information acquired from the respective internal components. Then, the data collection unit 17 collects the trace information with the count value.

The trace information collection system 1 configured as illustrated in FIG. 4 or 5 do not need to transfer trace information in units of cycles unlike the conventional trace information collection. Thus, a bandwidth of a data path can be reduced and it is unnecessary for the data collection unit 17 to have a large buffer. Further, the debugging apparatus 150, which is a destination of externally transfer of trace information, can reduce the amount of data to be received in a single transfer and thus does not need to have a large buffer. Furthermore, the configuration illustrated in FIG. 5 eliminates the need to have a data path dedicated to trace information.

The timer unit 13 of the trace information collection apparatus 10 illustrated in FIG. 1 (FIGS. 4 and 5) is implemented by a well-known periodic interrupt signal generation mechanism. Further, the timer unit 13 may include a well-known random number generation function.

Figure 6:
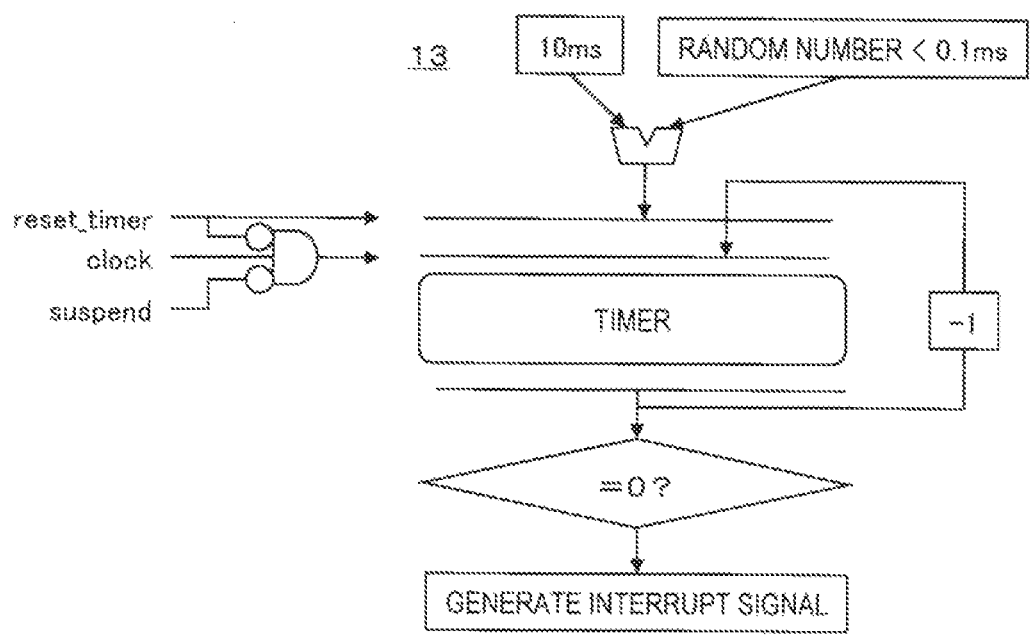
FIG. 6 illustrates a logic configuration example of a timer unit as an embodiment of one aspect of the present invention.

FIG. 6 illustrates a logic configuration example of the timer unit 13 as an embodiment.

A timer reset signal (reset_timer), a clock signal (clock), and a suspend signal (suspend) are inputted to the timer unit 13.

The timer unit 13 resets the timer value, for example, to 10 milliseconds (ms) or a random number added value by the timer reset signal (reset_timer) generated by a function reset_timer( ), or otherwise, always continues to decrement by 1 (−1) for each cycle of the chip 100, namely, in response to an input of the clock signal (clock), and generates an interrupt signal when the timer value reaches 0 (timer value=0).

The suspend signal (suspend) is a signal which is "1" when the target block is suspending program execution, and always "0" when the target block does not suspend the program execution. The suspend signal is outputted, for example, by the CPU 110, the hard macro 120, and the like.

The timer unit 13 suspends decrementing the timer value during suspend signal is 1(=1).

The random number generated by the timer unit 13 is 0.1 ms or less, and the random number is set to 0 when no random number is used.

Figure 7:
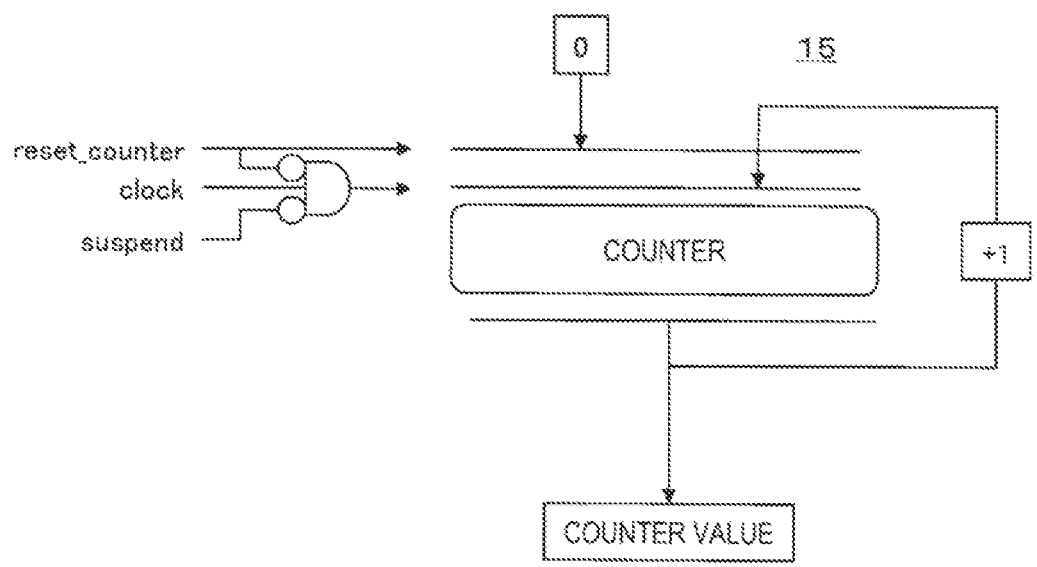
FIG. 7 illustrates a logic configuration example of a counter unit as an embodiment of one aspect of the present invention.

FIG. 7 illustrates a logic configuration example of the counter unit 15 as an embodiment.

A counter reset signal (reset counter), a clock signal (clock), and a suspend signal (suspend) are inputted to the counter unit 15.

The counter unit 15 resets the count value to "0" in response to the counter reset signal (reset_counter) generated by a function reset_counter( ) or otherwise continues to increment by 1 (+1) in response to an input of the clock signal (clock). The counter unit 15 suspends incrementing the count value in response to suspend signal is 1(=1).

Figure 8:
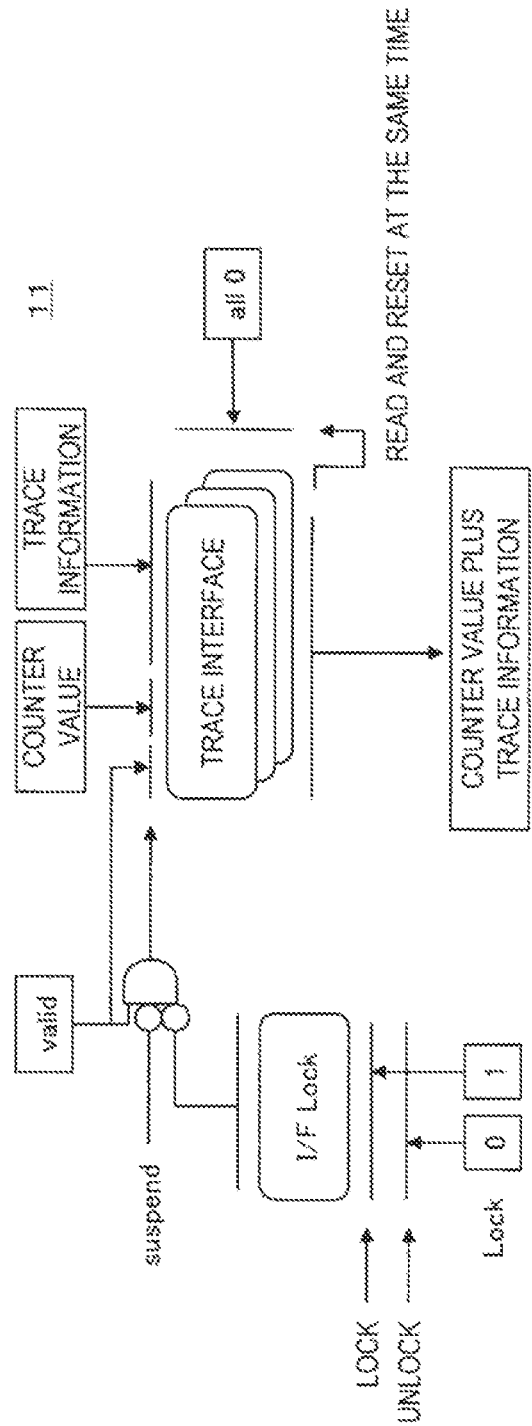
FIG. 8 illustrates a logic configuration example of a trace interface unit as an embodiment of one aspect of the present invention.

FIG. 8 illustrates a logic configuration example of the trace interface unit 11 as an embodiment.

A trace information, a valid signal (valid), a counter reset value, and a suspend signal (suspend) are inputted to the trace interface unit 11.

The trace interface unit 11 has a register locking mechanism (I/F Lock) for preventing the register content from being overwritten during interrupt processing.

The trace interface unit 11 receives trace data and a valid signal from a predetermined internal component of the target hardware 100b. If the valid signal is "valid (on)", the trace interface unit 11 stores the received trace data in the register.

The trace interface unit 11 uses the register locking mechanism such that if the lock signal (Lock) is "1", the register is locked; and if the lock signal (Lock) is "0", the register is unlocked. Writing to the register is enabled only while the register is unlocked. When a pair of trace data and count value (extended trace data) is read from the register, the trace interface unit 11 resets the register at the same time of reading.

The trace interface unit 11 can store a plurality of trace data, namely, a plurality of cycles of trace data, in the register. In this case, the trace interface unit 11 outputs the plurality of past cycles of trace data at a time.

Figure 9:
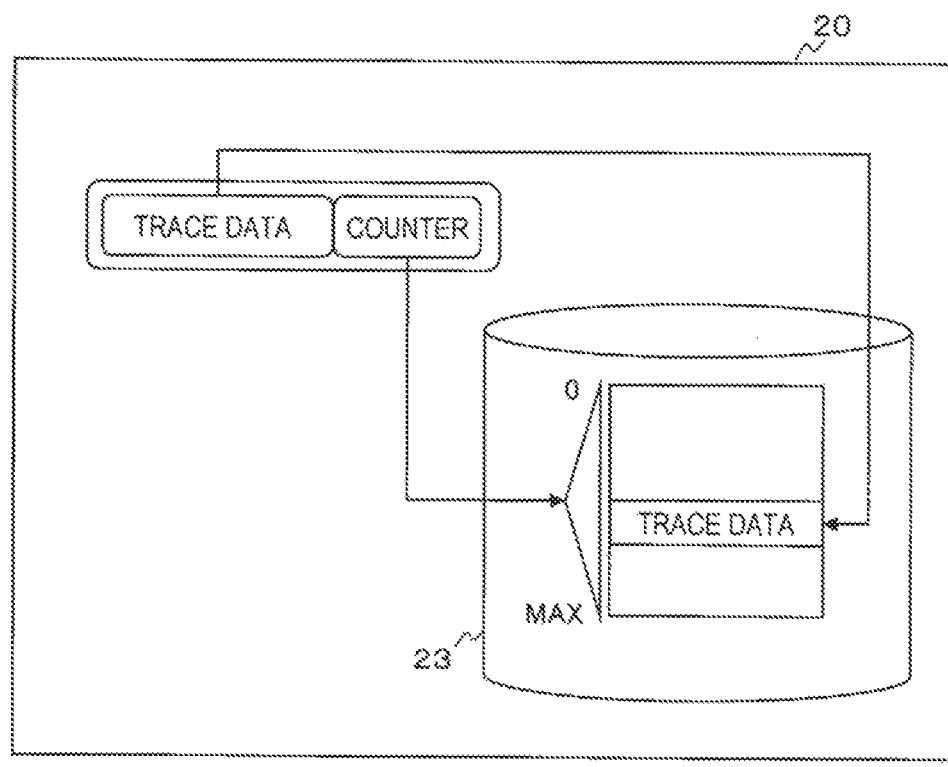
FIG. 9 illustrates an internal configuration example of a trace information storage unit as an embodiment of one aspect of the present invention.

FIG. 9 illustrates an internal configuration example of the trace information storage unit 23 of the trace information processing apparatus 20 as an embodiment.

The trace information storage unit 23 stores trace data which is sorted in ascending order from 0 to a maximum (MAX) based on the count value added to the trace data.

Figure 10:
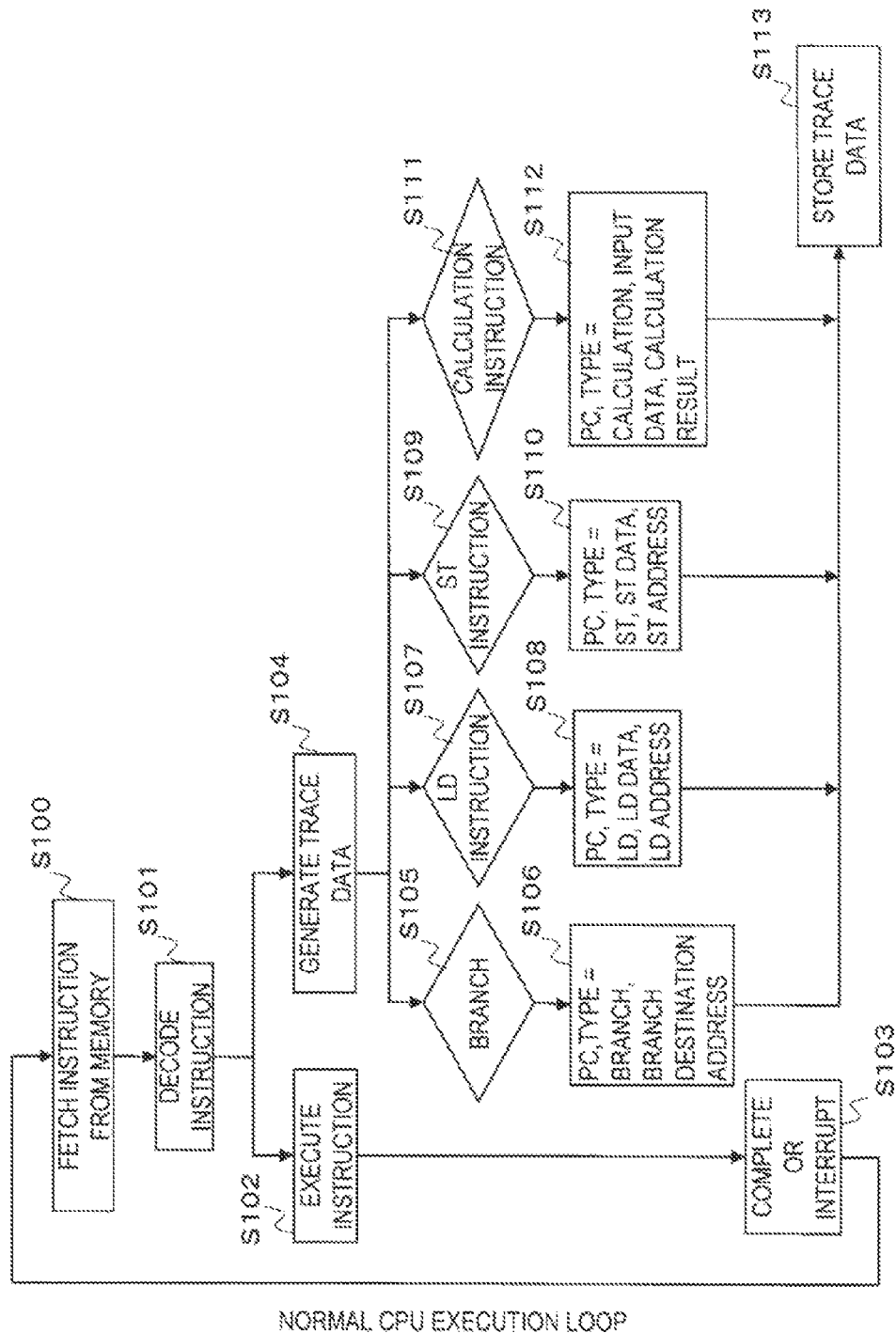
FIG. 10 illustrates a flow of a trace information acquisition process in a case in which the trace target is a CPU as an embodiment of one aspect of the present invention.

FIG. 10 illustrates a flow of a trace information acquisition process in a case in which the trace target is the CPU 110.

During normal execution loop in which the CPU 110 fetches an instruction from the memory (step S100), decodes the fetched instruction (step S101), executes the instruction (step S102), and completes or interrupts the execution (step S103), the CPU 110 generates trace data (step S104) according to the instruction in parallel to the instruction execution (step S102).

If the instruction is a branching instruction (step S105), the CPU 110 generates trace data including the program counter (PC), the instruction type (Type) set "branch" (Type=branch), the branching destination address, and the like (step S106). If the instruction is an LD instruction (step S107), the CPU 110 generates trace data including the program counter (PC), the instruction type (Type) set "LD" (Type=LD), LD data (data transferred to the register), LD address, and the like (step S108). If the instruction is an ST instruction (step S109), the CPU 110 generates trace data including the program counter (PC), the instruction type (Type) set "ST" (Type=ST), ST data (data transferred to the memory), ST address, and the like (step S110). If the instruction is a calculation instruction (step S111), the CPU 110 generates trace data including the program counter (PC), the instruction type (Type) set "calculation" (Type=calculation), input data, calculation result, and the like (step S112).

Then, the trace interface unit 11a stores the trace data generated in steps S106, S108, S110, and S112, in the internal register (step S113).

Figure 11:
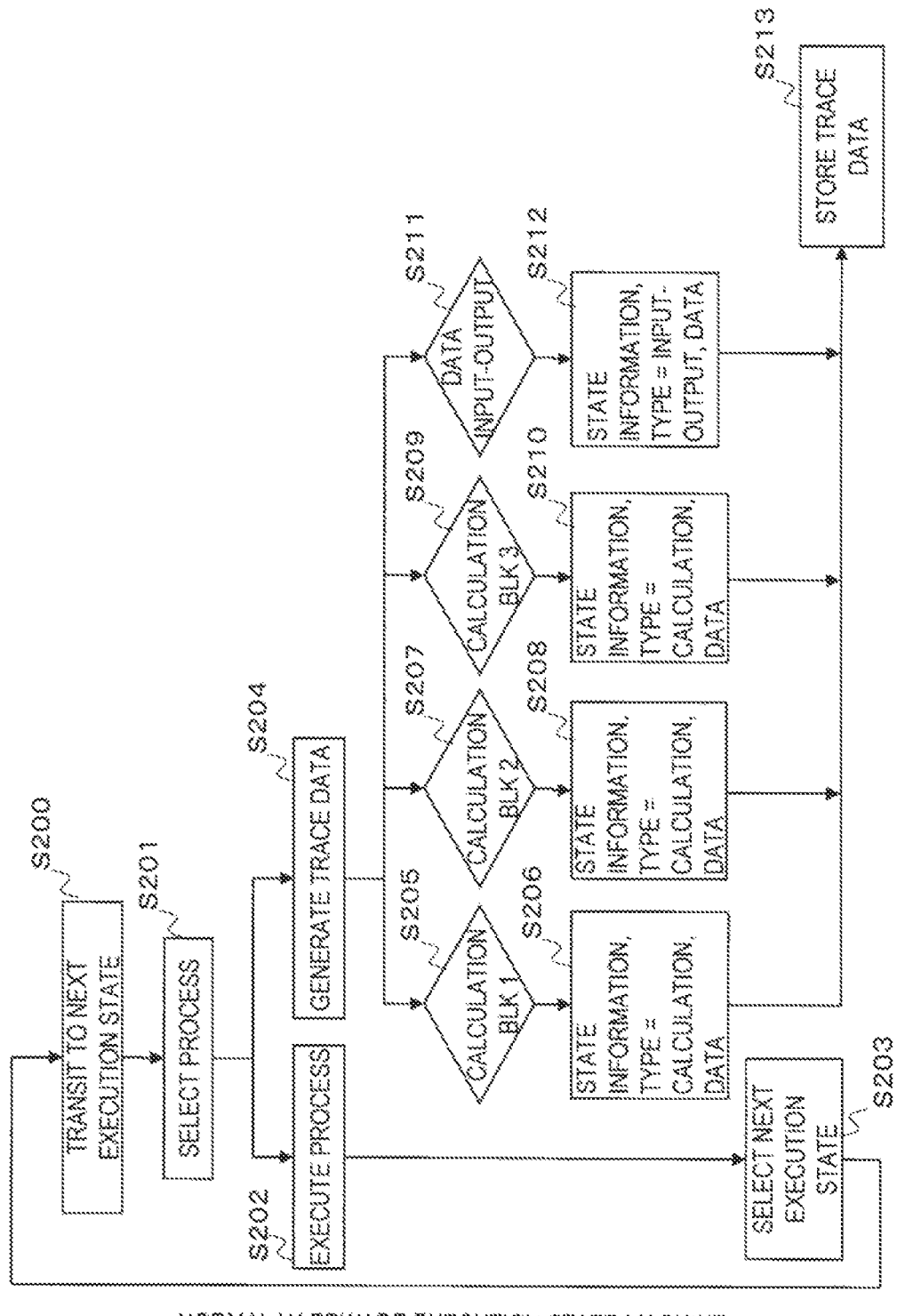
FIG. 11 illustrates a flow of a trace information acquisition process in a case in which the trace target is a hard macro as an embodiment of one aspect of the present invention.

FIG. 11 illustrates a flow of a trace information acquisition process in a case in which the trace target is the hard macro 120.

During execution of a normal execution state machine, the hard macro 120 transits to a selected execution state (step S200), selects a process (step S201), executes the process (step S202), and selects the next execution state (step S203), the hard macro 120 generates trace data (step S204) according to the process content in parallel to the process execution (step S202).

If the process is calculation Blk 1 (step S205), the hard macro 120 generates trace data including the state information, the process type (Type) set "calculation" (Type=calculation), data, and the like (step S206). If the process is calculation Blk 2 (step S207), the hard macro 120 generates trace data including the state information, the process type (Type) set "calculation" (Type=calculation), data, and the like (step S208). If the process is calculation Blk 3 (step S209), the hard macro 120 generates trace data including the state information, the process type (Type) set "calculation" (Type=calculation), data, and the like (step S210). If the process is data input-output (step S211), the hard macro 120 generates trace data including the state information, the process type (Type) set "input-output" (Type=input-output), data, and the like (step S212).

Then, the trace interface unit 11*b* stores the trace data generated in steps S206, S208, S210, and S212, in the internal register (step S213).

Figure 12:
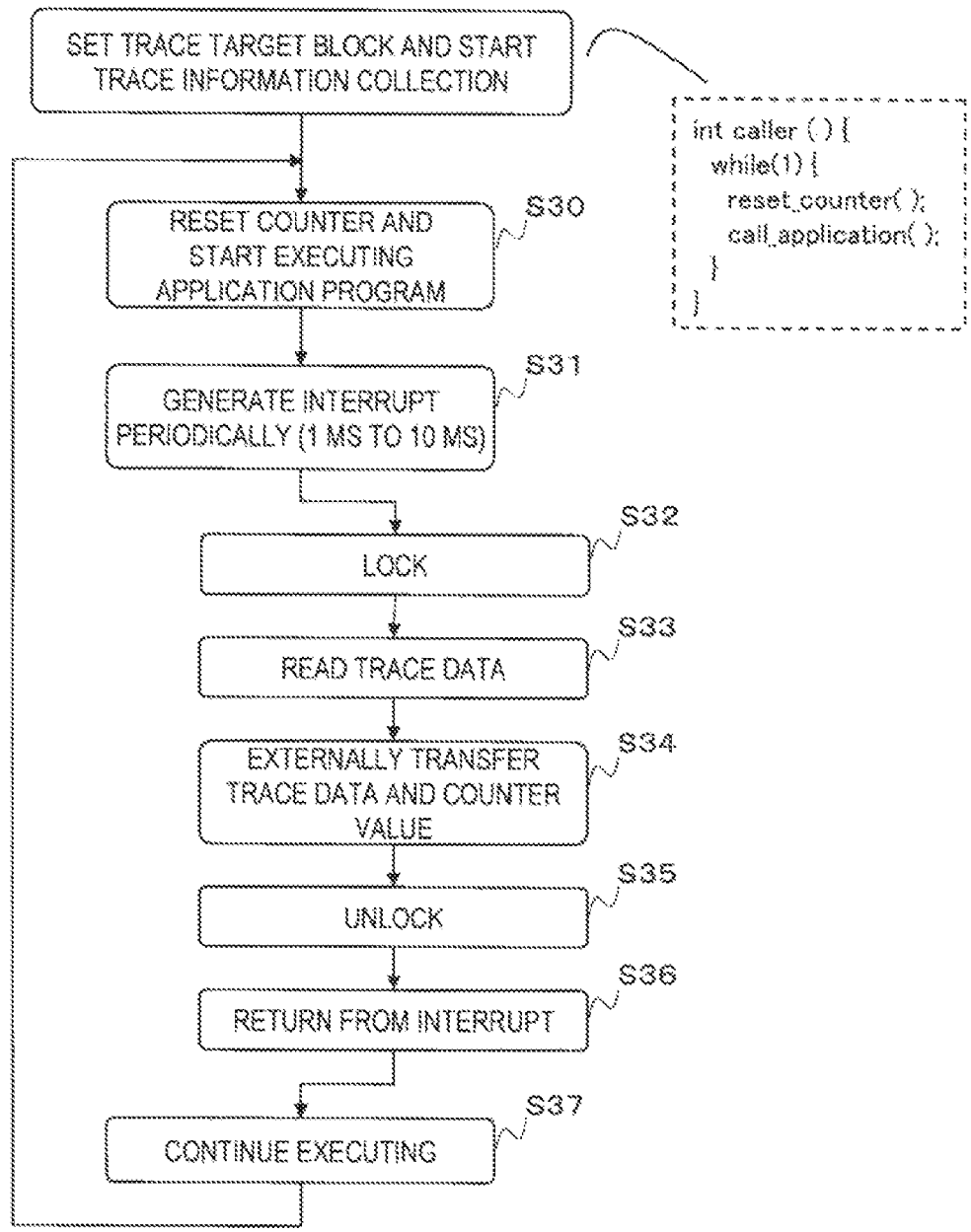
FIG. 12 illustrates a process flow of the trace interface unit configured as illustrated in FIG. 8.

FIG. 12 illustrates a process flow of the trace interface unit 11 configured as illustrated in FIG. 8.

The trace interface unit 11 starts during execution of a parent (higher level) layer program, which calls an application program to be executed by the target hardware 100*b*. The parent layer program is, for example, a program enclosed by a dotted line in FIG. 12.

The counter unit 15 initializes the count value. When an application program is called to execute, the application program is executed at the target hardware 100*b* (step S30).

The timer unit 13 generates an interrupt signal in an interval from 1 to 10 milliseconds (ms) (step S31). In response to the interrupt signal generated in step S31, the process in steps S32 to S36 is periodically repeated.

The trace interface unit 11 locks the register (step S32), reads the trace data stored in the register (step S33). The trace interface unit 11 transfers the trace data with the count value generated by the counter unit 15 to the data collection unit 17 outside the target hardware 100*b* (step S34). Then, the trace interface unit 11 unlocks the register (step S35), and returns from the interrupt processing (step S36).

If the application program continues executing on the trace target circuit block (step S37), the process returns to step S30, and the process following step S30 is repeated.

FIG. 13 illustrates an example of a program executed by the target hardware 100*b* in a case in which the trace information collection system 1 collects trace information.

The count value of the counter unit 15 is reset by the function counter_rest( ) included in the parent program int main( ) illustrated in FIG. 13A.

FIG. 13B illustrates the parent program int main( ) which calls a program (BODY( )) including several functions FN which are assumed to be executed in the order of "FN_A( ), FN_A( ), FN_A( ), FN_D( )", "FN_A( ), FN_B( )", "FN_B( ), FN_C( )", "FN_C( )", and "FN_D( )".

Figure 14:
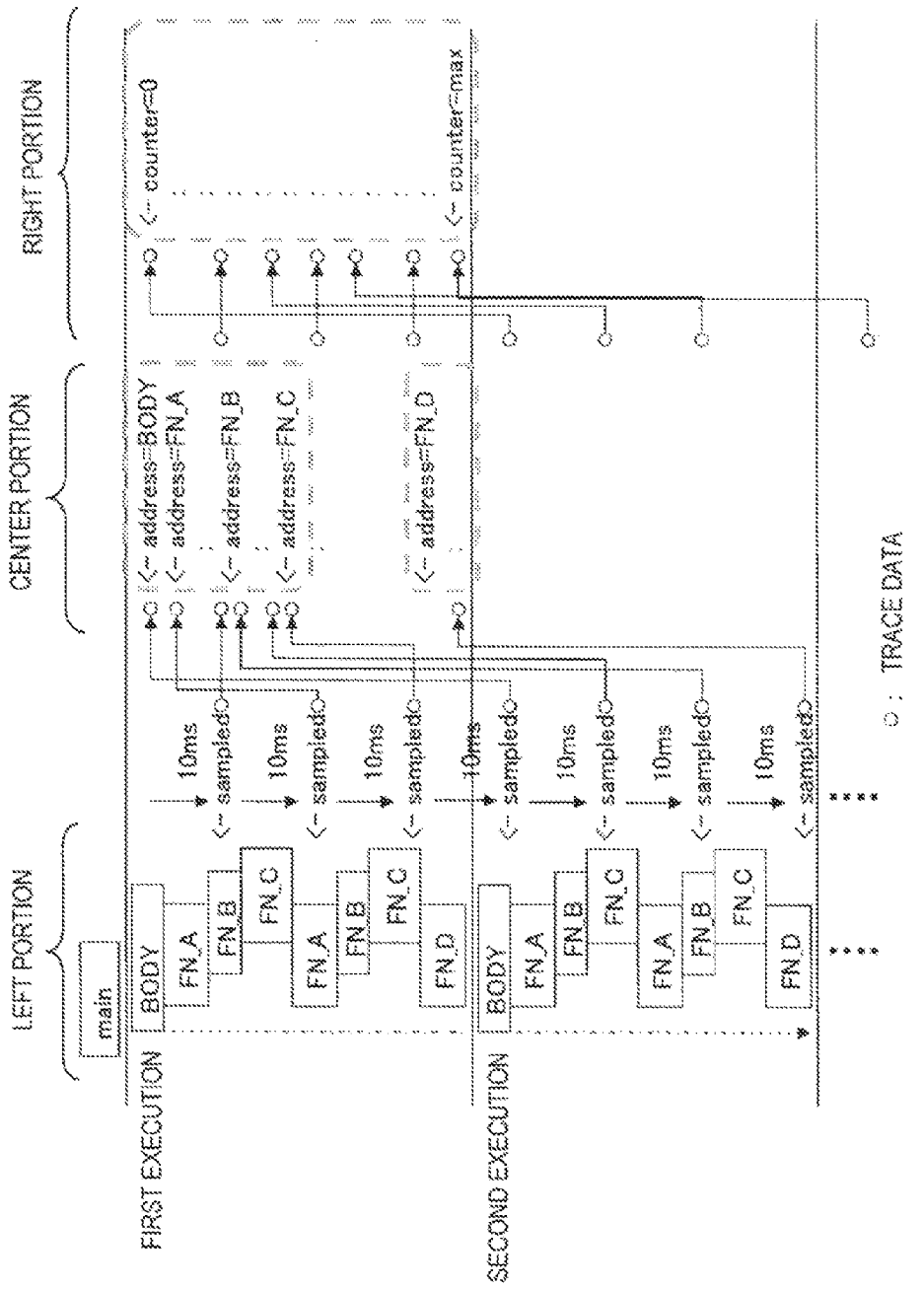
FIG. 14 illustrates an example of trace data collected during execution of the program illustrated in FIG. 13.

FIG. 14 illustrates an example of trace information collected during execution of the program illustrated in FIG. 13. In FIG. 14, trace data is indicated by a circle.

The left portion of FIG. 14 illustrates processes of the functions executed during execution of the program illustrated in FIG. 13. In addition, the left portion of FIG. 14 illustrates a state in which trace data is collected while the same program is executed twice or more.

The center portion of FIG. 14 illustrates a list of trace data in a case in which trace information of the program illustrated in the left portion of FIG. 14 is sorted by the address (function name). The right portion of FIG. 14 illustrates a list of trace data in a case in which trace information of the program illustrated in the left portion of FIG. 14 is sorted by the added count value.

When the trace data collected in the state illustrated in the left portion of FIG. 14 is sorted by the address, the trace data is organized by the process having the same address and rearranged as trace information in a program execution, as illustrated in the center portion of FIG. 14.

When the trace data collected in the state illustrated in the left portion of FIG. 14 is sorted by the count value, the trace data is organized by the same count value and rearranged as trace information in a program execution, as illustrated in the right portion of FIG. 14.

Here, the count value is incremented for each cycle. Therefore, the trace data having the same count value can be expected to be less than the trace data having the same address.

As illustrated in the center portion of FIG. 14, when the trace information collection apparatus 10 collects trace information in a 10 ms period, the process of sorting trace data by the address may cause trace data in a certain period of the program execution to be missing.

In contrast to this, the process of sorting trace data by the count value allows the sorted trace data to be aligned in a state of filling in between the actual sampling periods, and thus enables denser trace information to be acquired.

In particular, when the trace interface unit 11 stores a plurality of cycles of trace data, the trace data sort process by the trace information processing apparatus 20 allows the plurality of cycles of trace data to be collected for each sampling period, and thus the trace information equivalent to the trace data collected in a further denser interval can be collected.

As already described above, the disclosed trace information collection apparatus 10 can externally transfer trace information without using a large built-in mechanism on a trace target chip, and the disclosed trace information processing apparatus 20 can process trace information outputted from the target chip into information usable for problem analysis and various evaluations.

The disclosed trace information collection system 1 can be implemented not only by the above described embodiments but also by other configurations.

As already described above, the computer (PC) implementing the trace information processing apparatus 20 includes hardware such as a main control unit (CPU), a main storage unit, a file device, a display device, an input device which is input means such as a keyboard.

In this case, the data acquisition unit 21 and the data sort unit 22 of the trace information processing apparatus 20 can be implemented as a program executed by the computer.

More specifically, a program which codes the processing content of the data acquisition unit 21 and the data sort unit 22 is provided. When the program is executed by the computer, the respective processing units cooperate with the trace information storage unit 23 of the computer to implement the above described processing functions of the trace information processing apparatus 20.

The computer which executes the program stores a program in its own storage apparatus. The program is, for example, a program stored in a movable storage medium or a program transferred from another computer via a network such as a LAN. Then, the computer reads the program from its own storage apparatus and executes the process according to the program.

Alternatively, the computer can read the program directly from the movable medium and execute the process according to the program. Still alternatively, each time a program is transferred from the server computer, the computer can receive the program and execute the process according to the received program. Further, the program can be stored in a computer-readable storage medium.

As understood from the above embodiments, the disclosed trace information collection system will provide the following advantages.

(1) The disclosed trace information collection system 1 can realizes greatly simplified means of trace information execution using an embedded tracing, which conventionally requires a large scale one. In particular, there is enabled the trace information collection of the hard macro which is conventionally very difficult in a practical sense.

(2) The disclosed trace information collection system 1 can realizes simplified implementation for trace information extraction, which allows a mechanism for trace information extraction to be installed in a so-called mass-produced chip. Thus, real execution history information can be extracted from a chip in a final product form.

(3) The disclosed trace information collection system 1 can realizes greatly extended range of application for means of trace information extraction using an embedded tracing, which is conventionally limited.

According to the above disclosed apparatus for collecting trace information can collect trace information not in units of cycles but at a predetermined sampling period from a circuit block on the circuit board.

Moreover, according to the above disclosed apparatus for processing trace information can acquire trace information arranged in time series starting at the time of program execution.

Thus, a group of trace information in the same or similar state sampled at a shorter interval than at an actual sampling period can be provided.

In order to cope with the flow rate of information to be externally transferred, the conventional embedded tracing mechanism requires a large mechanism on a target chip. However, according to the disclosed apparatus for collecting trace information, a mechanism built-in on a target chip can be greatly simplified while substantially the same amount of trace information as before can be acquired. In particular, trace information about a complicated high-speed processor and a hard macro can be collected while such trace information cannot be actually collected by a conventional tracing mechanism.

For example, a trace information about a product chip can be directly collected by installing the disclosed apparatus for collecting trace information into a chip in a final form as an embedded tracing mechanism.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A system for collecting trace information comprising:
a first apparatus, for collecting trace information outputted by a circuit which executes a program, and
a second apparatus, for processing the trace information, wherein the first apparatus includes
a target circuit which executes a same program a plurality of times;
a counter configured to generate a count value, which is initialized at every start of execution of the same program and incremented a value based on each execution cycle of the program;
an interface unit configured to fetch trace information from the target circuit, then store the fetched trace information with a count value generated by the counter at a time of fetching the trace information; and
a collection unit configured to output the trace information with the count value; and
wherein the second apparatus includes
a trace information acquisition unit configured to acquire trace information from a trace information collected during more than one execution of the same program with the count value;
a sort processing unit configured to gather the acquired trace information into one and to sort the gathered trace information based on the count value; and
a trace information storage unit configured to store the sorted trace information.

2. The system according to claim 1, wherein the first apparatus includes
a timer configured to output an interrupt signal at a predetermined period; and
a port configured to output the trace information and the count value outputted by the collection unit from a predetermined port to outside the trace information apparatus; and
wherein the counter unit initializes the count value when the program starts executing and increments the count value for each execution cycle of the program, and the collection unit outputs the trace information and the count value outputted by the target circuit to the port unit when the outputted interrupt signal is received.

3. The system according to claim 1, wherein the target circuit is a processor or a hard macro.

4. The system according to claim 1, wherein the collection unit stores trace information corresponding to a plurality of cycles in time sequence from the target circuit and outputs the stored trace information and the count value when the interrupt signal is received.

5. The system according to claim 2, wherein the first apparatus includes a random number generation unit configured to generate a random number, and
wherein the timer unit outputs the interrupt signal when the period is extended or shortened based on the generated random number.

6. The system according to claim 1, wherein the program is executed continuously a plurality of times.

7. A system for collecting trace information comprising:
a first apparatus, for collecting trace information outputted by a circuit which executes a program, and
a second apparatus, for processing the trace information, wherein the first apparatus includes
a target circuit which executes a same program a plurality of times;
a processor configured to execute a procedure, the procedure comprising:
generating a count value, which is initialized at every start of execution of the same program and incremented a value based on each execution cycle of the same program;
fetching trace information from the target circuit; and
outputting the trace information with the count value and
wherein the second apparatus includes
a processor configured to execute a procedure, the procedure comprising:

acquiring trace information collected during more than one execution of the same program with the count value;
gathering the acquired trance information into one;
sorting the gathered trance information based on the count value; and
storing the sorted trace information.

8. A method of collecting trace information of a circuit block constituting a circuit board, the method executed by a trace information collection apparatus provided on the circuit board and a trace information processing apparatus connected to the trace information collection apparatus, the method comprising:
generating a count value, which is initialized at every start of execution of a same program and incremented a value based on each execution cycle of the same program executed a plurality of times by a target circuit;
fetching and storing trace information from the target circuit;
outputting the trace information with a count value generated at a fetching timing of the trace information;
acquiring the trace information collected during more than one execution of the same program with the count value;
gathering the acquired trace information into one;
sorting the acquired trace information based on the count value; and
storing the stored trace information.

* * * * *